US012627377B2

(12) United States Patent
Moore

(10) Patent No.: US 12,627,377 B2
(45) Date of Patent: May 12, 2026

(54) OPTICAL COMMUNICATIONS FOR PORTABLE ELECTRONIC DEVICES

(71) Applicant: Apple Inc., Cupertino, CA (US)

(72) Inventor: Christian I. Moore, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 18/198,618

(22) Filed: May 17, 2023

(65) Prior Publication Data

US 2023/0379057 A1    Nov. 23, 2023

Related U.S. Application Data

(60) Provisional application No. 63/344,000, filed on May 19, 2022.

(51) Int. Cl.
| | |
|---|---|
| *H04B 10/114* | (2013.01) |
| *G02B 27/01* | (2006.01) |
| *H04B 10/40* | (2013.01) |
| *H04B 10/69* | (2013.01) |
| *H04B 10/80* | (2013.01) |

(52) U.S. Cl.
CPC ........... *H04B 10/40* (2013.01); *G02B 27/017* (2013.01); *H04B 10/1143* (2013.01); *H04B 10/697* (2013.01); *H04B 10/808* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 8,073,324 B2 | 12/2011 | Tsai | | |
| 9,977,205 B2* | 5/2018 | Williams | ................ | H02J 50/90 |
| 10,295,770 B2* | 5/2019 | Williams | ............ | G02B 6/4277 |
| 10,604,274 B1* | 3/2020 | Zaehring | ............... | G06F 1/1601 |
| 2011/0050164 A1* | 3/2011 | Partovi | .................. | H02J 50/12 |
| | | | | 320/108 |
| 2012/0075082 A1* | 3/2012 | Rothkopf | .............. | G08C 19/28 |
| | | | | 348/E5.09 |

(Continued)

*Primary Examiner* — Li Liu

(74) *Attorney, Agent, or Firm* — Kilpatrick Townsend & Stockton LLP

(57) ABSTRACT

Circuits, methods, and apparatus that can transfer data and power between an optical-communication device and an electronic device without the need for electrical contacts on the electronic device. An example can include infrared transmitters and receivers in both the optical-communication device and the electronic device for optical communication. This can further include a coil in the optical-communication device that can be powered to inductively induce currents in a corresponding coil in the electronic device to charge a battery. One or more attachment components, such as magnets or magnetic elements, can be used to secure the optical-communication device to the electronic device. The optical-communication device to the electronic device can each include an alignment magnet or magnetic element. Either or both the optical-communication device and the electronic device can include digital signal processors in their receive paths to compensate for distortions and artifacts in the optical transmission and receive paths.

14 Claims, 5 Drawing Sheets

(56)        References Cited

U.S. PATENT DOCUMENTS

| | | | | |
|---|---|---|---|---|
| 2013/0183042 A1* | 7/2013 | Knapp | ................ | H04L 12/2838 |
| | | | | 398/106 |
| 2015/0045091 A1* | 2/2015 | Nakatani | ................ | H04B 5/266 |
| | | | | 455/556.1 |
| 2015/0102733 A1* | 4/2015 | Knapp | .................. | H05B 45/30 |
| | | | | 315/152 |
| 2015/0318100 A1* | 11/2015 | Rothkopf | ............... | H04B 5/263 |
| | | | | 361/170 |
| 2017/0078020 A1* | 3/2017 | Liu | ......................... | H04B 10/40 |
| 2017/0090134 A1* | 3/2017 | Williams | ................ | H02J 50/80 |
| 2018/0082620 A1* | 3/2018 | Chang | ................. | G09G 3/2092 |
| 2019/0372666 A1* | 12/2019 | Momtahan | ............ | H04B 10/11 |
| 2020/0020225 A1* | 1/2020 | Kurioka | ........... | B64D 11/00155 |
| 2020/0266891 A1* | 8/2020 | Murakami | ........... | H04B 10/116 |
| 2020/0388225 A1* | 12/2020 | Kim | ...................... | G09G 3/3258 |
| 2021/0099027 A1* | 4/2021 | Larsson | ................... | H04B 5/77 |
| 2021/0313680 A1* | 10/2021 | Turpin | ................... | H01Q 1/273 |

* cited by examiner

FIG. 1          10

OPTICAL COMMUNICATIONS FOR PORTABLE ELECTRONIC DEVICES

CROSS-REFERENCES TO RELATED APPLICATIONS

This application is claims priority to and the benefit of U.S. provisional application No. 63/344,000, filed on May 19, 2022, which is incorporated by reference.

BACKGROUND

The number of types of electronic devices that are commercially available has increased tremendously the past few years and the rate of introduction of new devices shows no signs of abating. Devices, such as tablets, laptops, desktops, all-in-one computers, smart phones, storage devices, wearable devices, portable media players, navigation systems, remote controls, monitors, and others, have become ubiquitous.

These electronic devices can often include one or more connector receptacles though which they can provide and receive power and data. These connector receptacles can accept connector inserts that can be at a first end of a cable, where the cable can be attached to a second electronic device, power adapter, or other device at a second end. But these connector receptacles can include metallic contacts over which power and data are transferred, and unfortunately metallic contacts can corrode when exposed to liquids or moisture. In particular, electrochemical migration can occur as voltages are applied to a contact having a liquid at its surface. The resulting corrosion can degrade functionality and appearance of the contacts. As a result, the usefulness of electronic devices having exposed contacts is reduced where they are exposed to sweat or other liquids.

To avoid such corrosion, the contacts can be plated using exotic materials. But it can be desirable to conserve resources. Also, these contacts can become marred with use and this wear can damage the protective plating on the contacts, thereby exposing the contacts to further corrosion. Data can also be transferred using wireless radio frequency (RF) connections, but such RF connections can be subject to interference and signal drop-out.

Thus, what is needed are circuits, methods, and apparatus that can transfer data and power to an electronic device without the need for electrical contacts on the electronic device.

SUMMARY

Accordingly, embodiments of the present invention can provide circuits, methods, and apparatus that can transfer data and power to an electronic device without the need for electrical contacts on the electronic device. An illustrative embodiment of the present invention can provide an optical-communication device. This optical-communication device can include optical data paths for transmitting data to and receiving optical data from an electronic device. The optical data can be infrared or other wavelength optical data. This optical-communication device can be a wireless charging and optical-communication device. For example, it can include a coil that can be used to inductively generate currents in a corresponding coil in the electronic device that can be used to charge a battery in the electronic device. The optical-communication device can further include one or more attachment structures to help secure the optical-communication device to the electronic device to allow power and data transfers. The optical-communication device can include one or more magnets or magnetic elements to be attracted to one or more magnets or magnetic elements in the electronic device. The optical-communication device can further include an alignment magnet to be attracted to a corresponding alignment magnet in the electronic device to align the optical-communication device to the electronic device for optical data transmission and reception.

The optical-communication device can include a housing having a charging surface, where the charging surface can include a window formed of an infrared transmissible material. The window can have various shapes, for example a window can have a shape that identifies a type of device, a manufacturer, a country of origin, or other attribute of the optical-communication device. A digital-signal processor can be included in the optical receive path for the optical-communication device. This digital-signal processor can compensate for smudges, scratches, and other artifacts on the window of the optical-communication device as well as a corresponding window on the electronic device. A connector receptacle of the optical-communication device can receive power and data to be converted to optical data for transmission to the electronic device. The connector receptacle can further provide data optically received and converted to an electrical signal by the optical-communication device.

Another illustrative embodiment of the present invention can provide an electronic device. This electronic device can include optical data paths for transmitting data to and receiving optical data from an optical-communication device. The optical data can be infrared or other wavelength optical data. This electronic device can be charged by the optical-communication device. For example, the electronic device can include a coil that can receive inductively generate currents from a corresponding coil in the optical-communication device, where the currents can be used to charge a battery in the electronic device. The electronic device can further include one or more attachment structures to help secure the electronic device to the optical-communication device to allow power and data transfers. For example, the electronic device can include one or more magnets or magnetic elements to be attracted to one or more magnets or magnetic elements in the optical-communication device. The electronic device can further include an alignment magnet or magnetic element to be attracted to a corresponding alignment magnet or magnetic element in the optical-communication device to align the electronic device to the optical-communication device for optical data transmission and reception.

The electronic device can include a housing having a charging surface, where the charging surface can include a window formed of an infrared transmissible material. The window can have various shapes, for example a window can have a shape that identifies a type of device, a manufacturer, a country of origin, or other attribute of the optical-communication device. A digital-signal processor can be included in the optical receive path for the electronic device. This digital-signal processor can compensate for smudges, scratches, and other artifacts on the window of the electronic device as well as a corresponding window on the optical-communication device.

These and other embodiments of the present invention can utilize various structures on an electronic device for communicating with an optical-communication device. For example, a portion of screen or display on the electronic device can be used to display colors, brightness variations, or images that can be received as information by an optical-communication device. A camera can be used to receive information from an optical-communication device. A flash used for a camera can be used as a transmitter. In one example, a first camera on an electronic device can receive data from a transmitter on an optical-communication device. A lens for a second camera on the electronic device can be used as a transmission path for transmitting data to the optical-communication device. The electronic device and optical-communication device can each include corresponding magnets or magnetic elements for attachment and corresponding magnets or magnetic elements for alignment.

These and other embodiments of the present invention can provide battery packs that can be charged by and can act as data pathways for communication between an optical-communication device and an electronic device. The battery pack can include optical data paths for transmitting data to and receiving optical data from an optical-communication device. The optical data can be infrared or other wavelength optical data. The battery pack can be charged by the optical-communication device using a coil that can receive inductively generated currents from a corresponding coil in the optical-communication device. The induced currents can be used to charge a battery in the battery pack. The battery pack can further include one or more attachment structures to help secure the battery pack to the optical-communication device to allow power and data transfers. For example, the battery pack can include one or more magnets or magnetic elements to be attracted to one or more magnets or magnetic elements in the optical-communication device. The battery pack can further include an alignment magnet or magnetic element to be attracted to a corresponding alignment magnet or magnetic element in the optical-communication device to align the battery pack to the optical-communication device for optical data transmission and reception.

The battery pack can include a housing having a charging surface, where the charging surface can include a window formed of an infrared transmissible material. The window can have various shapes, for example a window can have a shape that identifies a type of device, a manufacturer, a country of origin, or other attribute of the optical-communication device. A digital-signal processor can be included in the optical receive path for the battery pack. This digital-signal processor can compensate for smudges, scratches, and other artifacts on the window of the electronic device as well as a corresponding window on the optical-communication device.

The battery pack can be configured to remain attached to an electronic device or the battery pack can be configured to be separate from the electronic device during operation. For example, the battery pack can be configured to be magnetically attached to the electronic device, the battery pack can be a portion of a case that fits on an electronic device, or other arrangements can be used. The battery pack can include a connector that mates with a connector on the electronic device, either directly or through a cable. When the battery pack is separate, the battery pack can communicate with the electronic device over the cable.

These and other embodiments of the present invention can provide a wearable headset system that includes a wearable headset, one or more remote optical transceivers, one or more remote cameras, one or more remote light sources, and one or more processing circuits. The remote optical transceivers, remote cameras, and remote light sources can be attached to a wall, ceiling, or other surface. The remote optical transceivers, remote cameras, and remote light sources can be attached to an optional attachment device, such as a rack, to form an attachment structure that can be attached to the ceiling, wall, or other appropriate surface. The wearable headset can include one, two, or more optical transceivers that can communicate with the remote optical transceivers, remote cameras, and remote light sources. The headset can further include one or more cameras that can be (as with the remote cameras) monochrome cameras, visible light cameras, or other types of cameras. A processor can receive inputs from the one or more headset and remote cameras and can generate images for display on a screen of the wearable headset. The processor can be located in or on the wearable headset, the attachment structure, or elsewhere. The processor can be a distributed processor that is located in one or more of these locations. The distributed processor can communicate via the various optical transceivers or by other method, such as by using Bluetooth.

In these and other embodiments of the present invention, the windows can include optically transparent areas or lenses. An optical gasket can be formed or placed around sides of the windows to prevent moisture leakage. The windows can be opaque in areas to reduce light scattering in the optical data paths. The transmit data path and receive data path can share a window, or separate windows can be used. In some embodiments of the present invention, optical transmit and receive signals can be alternately provided in a half-duplex or unidirectional mode. In other embodiments of the present invention, optical transmit and receive signals can be conveyed using different frequencies of light and data can be transferred in a full-duplex mode. In these and other embodiments, the optical transmit and receive signals can be proximate, noninterfering signals operating in full-duplex mode.

In these and other embodiments of the present invention, the windows and other optically transmissible components can be formed using sapphire, polycarbonate, glass or other material. The optical gaskets and other optically nontransmissible components can be formed of silicone, plastic, or other material.

Embodiments of the present invention can provide optical data paths that can be located in, or can connect to, various types of devices, such as portable computing devices, tablet computers, desktop computers, laptops, all-in-one computers, wearable computing devices, smart or cell phones, storage devices, portable media players, navigation systems, monitors, power supplies, adapters, remote control devices, chargers, and other devices.

Various embodiments of the present invention can incorporate one or more of these and the other features described herein. A better understanding of the nature and advantages of the present invention can be gained by reference to the following detailed description and the accompanying drawings.

DESCRIPTION OF EXEMPLARY EMBODIMENTS

Electronic devices can often include connector receptacles through which they can receive and transmit power and data. These connector receptacles can include metallic contacts. Unfortunately, these metallic contacts can corrode when exposed to liquid or moisture. This can be particularly true when a contact is exposed to an electric field. Accordingly, embodiments of the present invention can provide circuits, methods, and apparatus for transferring power and data to an electronic device without the need for metallic contacts. An example is shown in the following figure.

Figure 1:
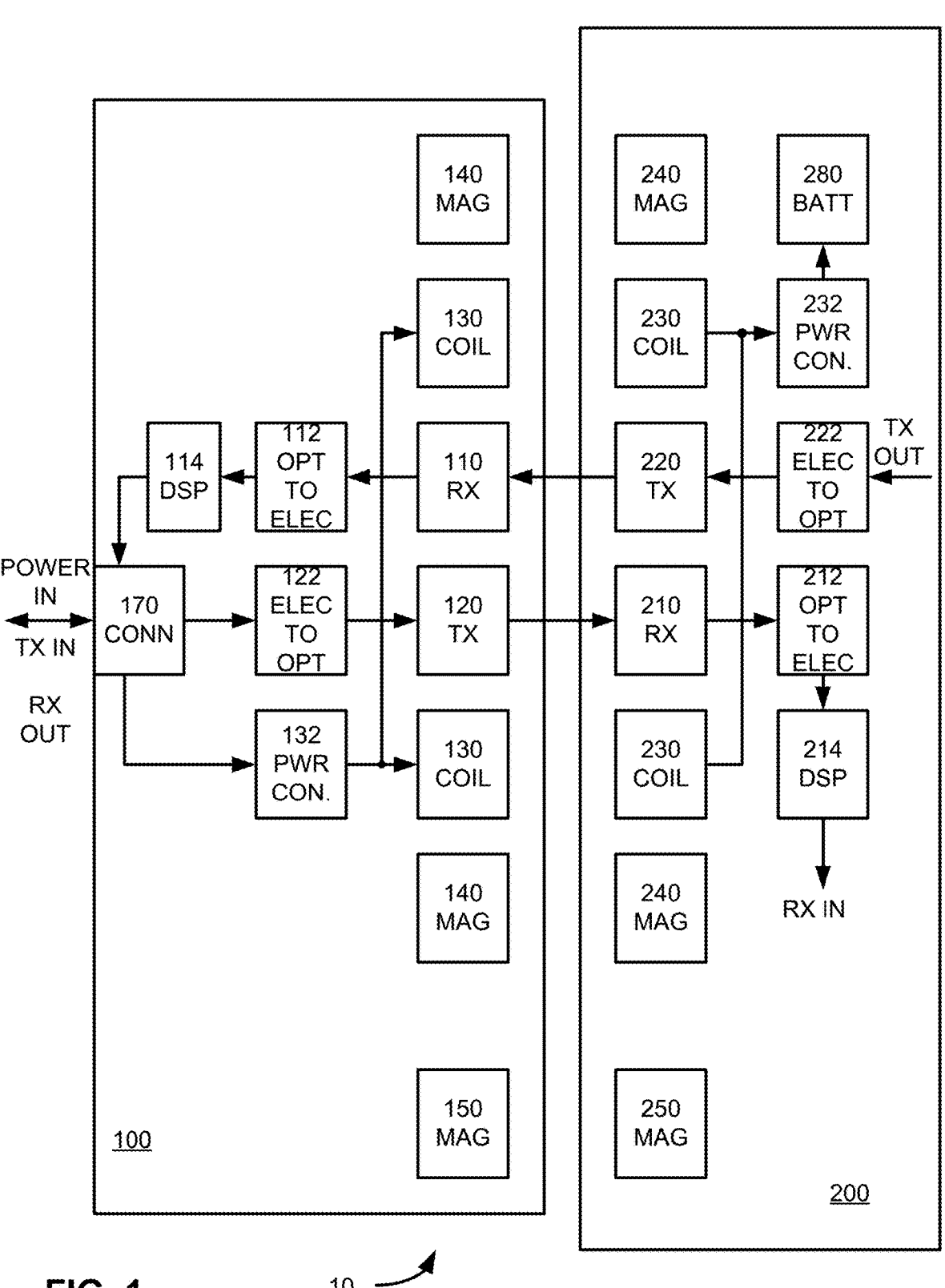
FIG. 1 illustrates an optical communication system according to an embodiment of the present invention.

FIG. 1 illustrates an optical data system according to an embodiment of the present invention. This figure, as with the other included figures, is shown for illustrative purposes and does not limit either the possible embodiments of the present invention or the claims.

Optical data system 10 can include optical-communication device 100 and electronic device 200. Optical-communication device 100 can use optical transmitter 120 to transmit optical data to electronic device 200. Optical-communication device 100 can use optical receiver 110 to receive optical data from electronic device 200. Optical-communication device 100 can use coil 130 provide charging power to electronic device 200 via coil 230. Optical-communication device 100 can further include one or more magnets or magnetic elements 140 that can be attracted to one or more corresponding magnets or magnetic elements 240 in electronic device 200 to physically secure optical-communication device 100 to electronic device 200. Optical-communication device 100 can further include one or more alignment magnets or magnetic elements 150 to properly align optical-communication device 100 to electronic device 200 using alignment magnets or magnetic elements 250. Optical-communication device 100 can further include digital-signal processor 114 to process signals received from electronic device 200. This signal processing can compensate for errors and artifacts caused by physical anomalies in the optical data path. (As shown below, these physical anomalies can be smudges or marring on surfaces of windows 910 and 1010 (shown in FIG. 5) in the optical data paths between optical-communication device 100 and electronic device 200.)

Optical transmitter 120 can transmit data through window 910 in optical-communication device 100, and optical receiver 210 can receive this data through window 1010 in electronic device 200. Optical transmitter 220 can transmit data through window 1010 in electronic device 200, and optical receiver 110 can receive this data through window 910 in optical-communication device 100. These windows 910 and 1010 can be formed of a single window, or separate windows can be used for the transmit and receive paths. The window or windows can be formed of an infrared transmissible material. The windows 910 and 1010 can have various shapes. For example, either or both windows 910 and 1010 can have shapes that identify a type of device, a manufacturer, a country of origin, or other attribute of the optical-communication device.

Optical receiver 110 can include a photodiode, CMOS sensor, PIN diode, or other receiver (not shown.) Data received from optical receiver 110 can be converted to an electronic protocol by optical-to-electrical converter 112. Optical-to-electrical converter 112 can provide data to digital-signal processor 114. Digital-signal processor 114 can compensate for artifacts, such as smudges or abrasions, on window 1010 of electronic device 200 and window 910 of optical-communication device 100. Digital-signal processor 114 can provide data to connector 170. Connector 170 can be compliant with a standard or proprietary interface. For example, connector 170 can be compatible with a universal serial bus interface, such as USB Type-C. During operation, connector 170 can be connected to a cable (not shown) to a host computer, power adapter, or other electronic device (not shown.)

Optical-communication device 100 can further receive data over connector 170. Electronic signals received at connector 170 can be converted to an optical format by electrical-to-optical converter 122. This data can be transmitted by optical transmitter 120. Optical transmitter 120 can be a laser, light-emitting diode, vertical cavity surface-emitting diodes, or other appropriate device (not shown.) Optical transmitter 120 can provide data to optical receiver 210 in electronic device 200.

Connector 170 can further receive power via connector 170. This power can be received by power control circuit 132. Power control circuit 132 can provide time varying currents to coil 130. These currents can generate a magnetic flux that can induce currents in corresponding coil 230 in electronic device 200. In this example, coil 130 is shown in cross-section and can be implemented as loops of wire around optical receiver 110 and optical transmitter 120.

Optical-communication device 100 can further include one or more attachment devices. For example, optical-communication device 100 can include one or more magnets or magnetic elements 140 that can be attracted to one or more magnets or magnetic elements 240 in electronic device 200. In this example, magnets or magnetic elements 140 can include one or more magnets or magnetic elements shown here in cross-section and forming a ring around coil 130 in optical-communication device 100.

In these and other embodiments of the present invention, optical receiver 110 and optical transmitter 120 may operate correctly independent of a rotational angle of optical-communication device 100 relative to electronic device 200. This can be particularly true when a single window 910 is shared between optical receiver 110 and optical transmitter 120. However, having this capability can limit communication throughput to half-duplex unless optical receiver 110 and optical transmitter 120 operate using different wavelengths. To simplify full-duplex communication, it can be desirable to align optical receiver 110 and optical transmitter 120 in optical-communication device 100 with optical transmitter 220 and optical receiver 210 in electronic device 200, respectively. Accordingly, optical-communication device 100 can include one or more alignment magnets or magnetic elements 150. Alignment magnets or magnetic elements 150 can be attracted to one or more corresponding alignment magnets or magnetic elements 250 in electronic device 200. Alignment magnets or magnetic elements 150 and alignment magnets or magnetic elements 250 can be positioned at a single location such that their attraction helps to orient optical-communication device 100 at a specific rotational angle relative to electronic device 200.

Electronic device 200 can use optical transmitter 220 to transmit optical data to optical-communication device 100. Electronic device 200 can use optical receiver 210 to receive optical data from electronic device 200. Electronic device 200 can use coil 230 to receive charging power from optical-communication device 100 via coil 130. Electronic device 200 can further include one or more magnets or magnetic elements 240 that can be attracted to one or more corresponding magnets or magnetic elements 140 in optical-communication device 100 to physically secure electronic device 200 to optical-communication device 100. Electronic device 200 can further include one or more alignment magnets or magnetic elements 250 to properly align electronic device 200 to optical-communication device 100 using alignment magnets or magnetic elements 150. Electronic device 200 can further include digital-signal processor 214 to process signals received from optical-communication device 100. As before, signal processing can compensate for errors and artifacts caused by physical anomalies in the optical data path.

Optical receiver 210 can include a photodiode, CMOS sensor, PIN diode, or other receiver (not shown.) Data received from optical receiver 210 can be converted to an electronic protocol by optical-to-electrical converter 212. Optical-to-electrical converter 212 can provide data to digital-signal processor 214. Digital-signal processor 214 can compensate for artifacts, such as smudges or abrasions, on window 1010 of electronic device 200 and window 910 of optical-communication device 100. Digital-signal processor 214 can provide data to circuits (not shown) in electronic device 200.

Circuits in electronic device 200 can provide electronic signals to be converted to an optical format by electrical-to-optical converter 222. This data can be transmitted by optical transmitter 220. Optical transmitter 220 can be a laser, light-emitting diode, vertical cavity surface-emitting diodes, or other appropriate device (not shown.) Optical transmitter 220 can provide data to optical receiver 110 in optical-communication device 100.

Currents can be induced in coil 230 by time varying currents in coil 130. That is, the currents in coil 130 in optical-communication device 100 can generate a time-varying magnetic flux that can induce currents in coil 230 in electronic device 200. In this example, coil 230 is shown in cross-section and can be implemented as loops of wire around optical receiver 210 and optical transmitter 220. Currents in coil 230 can be used by power control circuit 232 to charge battery 280 in electronic device 200.

Electronic device 200 can further include one or more attachment devices. For example, electronic device 200 can include one or more magnets or magnetic elements 240 that can be attracted to one or more magnets or magnetic elements 140 and optical-communication device 100. In this example, magnets or magnetic elements 240 can include one or more magnets or magnetic elements shown here in cross-section and forming a ring around coil 230 in electronic device 200.

These and other embodiments of the present invention can utilize various structures on an electronic device for communicating with an optical-communication device. For example, a portion of screen or display on the electronic device can be used to display colors, brightness variations, or images that can be received as information by an optical-communication device. A camera can include a CMOS sensor that can be used to receive information from an optical-communication device. A flash used for a camera can be used as a transmitter. In one example, a first camera on an electronic device can receive data from a transmitter on an optical-communication device. A lens for a second camera on the electronic device can be used as a transmission path for transmitting data to the optical-communication device. The electronic device and optical-communication device can each include corresponding magnets or magnetic elements for attachment and corresponding magnets or magnetic elements for alignment. An example is shown in the following figure.

Figure 2:
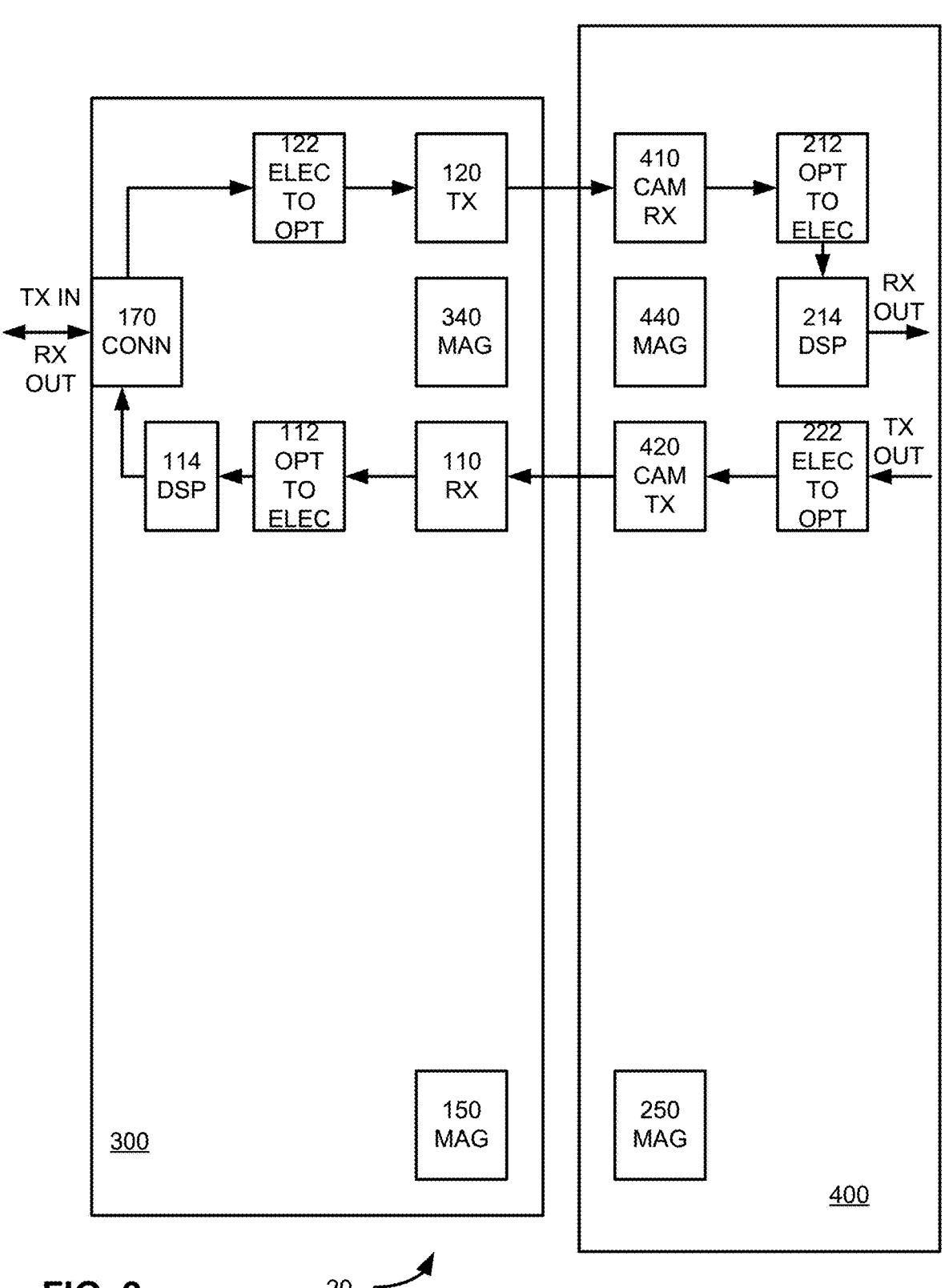
FIG. 2 illustrates another optical communication system according to an embodiment of the present invention.

FIG. 2 illustrates another optical communication system according to an embodiment of the present invention. In this example, optical-communication device 300 can exchange data with electronic device 400. Optical transmitter 120 in optical-communication device 300 can transmit optical data to camera receiver 410 in electronic device 400. Camera receiver 410 can be implemented using some or all of a pixel sensor array that can also provide camera functionality for electronic device 400. Optical data received by camera receiver 410 can be provided to optical-to-electrical converter 212. Optical-to-electrical converter 212 can convert data from an optical format to an electrical format and provide an output to digital-signal processor 214. Digital-signal processor 214 can provide processed received data to other circuitry (not shown) in electronic device 500. Digital-signal processor 214 can compensate for aberrations in the optical signal path between optical transmitter 120 and camera receiver 410.

Optical transmitter 120 can be a laser, light-emitting diode, vertical cavity surface-emitting diodes, or other appropriate device (not shown.) Optical transmitter 120 can transmit data through window 910 (shown in FIG. 5) in optical-communication device 300, and optical receiver 210 can receive this data through window 1010 (shown in FIG. 5) in electronic device 400. Optical transmitter 220 can transmit data through window 1010 in electronic device 400, and optical receiver 110 can receive this data through window 910 in optical-communication device 300. These windows can be formed of a single window, or separate windows can be used for the transmit and receive paths. The window or windows can be formed of an infrared transmissible material. These windows can have various shapes. For example, a window can have a shape that identifies a type of device, a manufacturer, a country of origin, or other attribute of the optical-communication device.

Electronic device 200 can provide data to be transmitted to electrical-to-optical converter 222. Electrical-to-optical converter 222 can convert data to a format for optical transmission and provide data to be transmitted to camera transmitter 420. Camera transmitter 420 can include various portions of a camera for electronic device 400. For example, camera transmitter 420 can utilize lenses, flashes, and additional circuitry, such as lasers or light-emitting diodes. Optical data transmitted by camera transmitter 420 can be received by optical receiver 110 in optical-communication device 300. Optical receiver 110 can include a photodiode, CMOS sensor, PIN diode, or other receiver (not shown.) Optical receiver 110 can provide an output to optical-to-electrical converter 112, which can convert data from an optical format to an electrical format and provide an output to digital-signal processor 114. Digital-signal processor 114 can compensate for aberrations in the optical signal path between camera transmitter 320 and optical receiver 110. Digital-signal processor 114 can provide an output to a host computer or other device via connector 170. Data to be transmitted by optical transmitter 120 can be received at connector 170 and converted to a signal compatible with optical signaling by electrical-to-optical converter 122.

Optical-communication device 300 can further include one or more attachment devices. For example, optical-communication device 300 can include one or more magnets or magnetic elements 340 that can be attracted to one or more magnets or magnetic elements 440 in electronic device 400. If a specific orientation between optical-communication device 300 and electronic device 400 is desirable or necessary, optical-communication device 300 can include one or more alignment magnets or magnetic elements 150 that can be attracted to one or more alignment magnets or magnetic elements 250 in electronic device 400.

These and other embodiments of the present invention can provide battery packs that can be charged by and can act as data pathways for communication between an optical-communication device and an electronic device. The battery pack can include optical data paths for transmitting data to and receiving optical data from an optical-communication device. The battery pack can include a connector for electrical data paths for transmitting data to and receiving data from the electronic device. The optical data can be infrared or other wavelength optical data. The battery pack can be charged by the optical-communication device using a coil that can receive inductively generated currents from a corresponding coil in the optical-communication device. The induced currents can be used to charge a battery in the battery pack. The battery pack can further include one or more attachment structures to help secure the battery pack to the optical-communication device to allow power and data transfers. For example, the battery pack can include one or more magnets or magnetic elements to be attracted to one or more magnets or magnetic elements in the optical-communication device. The battery pack can further include an alignment magnet to be attracted to a corresponding magnet in the optical-communication device to align the battery pack to the optical-communication device for optical data transmission and reception. A digital-signal processor can be included in the optical receive path for the battery pack. This digital-signal processor can compensate for smudges, scratches, and other artifacts on a window of the electronic device as well as a corresponding window on the optical-communication device.

The battery pack can be configured to remain attached to an electronic device or the battery pack can be configured to be separate from the electronic device during operation of the battery pack. For example, the battery pack can be configured to be magnetically attached to the electronic device, the battery pack can be a portion of a case that fits on an electronic device, or other arrangement can be used. The battery pack can include a connector that mates with a connector on the electronic device. When the battery pack is separate, the battery pack can communicate with the electronic device over a cable. An example is shown in the following figure.

Figure 3:
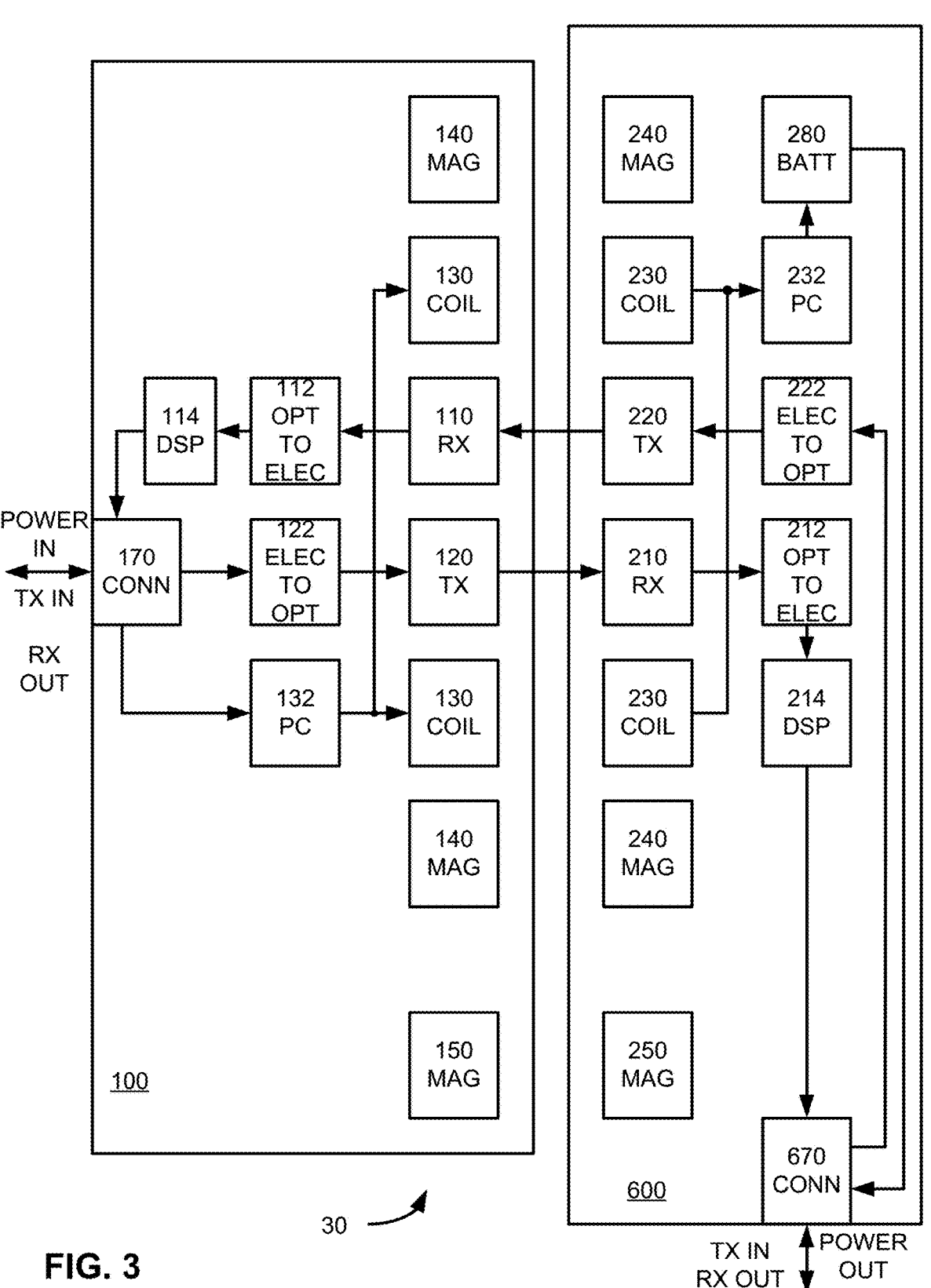
FIG. 3 illustrates an optical communication system including a battery pack according to an embodiment of the present invention.

FIG. 3 illustrates an optical data system according to an embodiment of the present invention. Optical data system 30 can include optical-communication device 100 and battery pack 600. Optical-communication device 100 can be the same as or similar to optical-communication device 100 in FIG. 1. Optical-communication device 100 can use optical transmitter 120 to transmit optical data to battery pack 600. Optical-communication device 100 can use optical receiver 110 to receive optical data from battery pack 600. Optical-communication device 100 can use coil 130 to provide charging power to battery pack 600 via coil 230. Optical-communication device 100 can further include one or more magnets or magnetic elements 140 that can be attracted to one or more corresponding magnets or magnetic elements 240 in battery pack 600 to physically secure optical-communication device 100 to battery pack 600. Optical-communication device 100 can further include one or more alignment magnets or magnetic elements 150 to properly align optical-communication device 100 to battery pack 600 using alignment magnets or magnetic elements 250. Optical-communication device 100 can further include digital-signal processor 114 to process signals received from battery pack 600. This signal processing can compensate for errors and artifacts caused by physical anomalies in the optical data path.

Optical transmitter 120 can transmit data through window 910 (shown in FIG. 5) in optical-communication device 100, and optical receiver 210 can receive this data through window 1010 (shown in FIG. 5) in battery pack 600. Optical transmitter 220 can transmit data through window 1010 in battery pack 600, and optical receiver 110 can receive this data through window 910 in optical-communication device 100. These windows can be formed of a single window, or separate windows can be used for the transmit and receive paths. The window or windows can be formed of an infrared transmissible material. These windows can have various shapes. For example, a window can have a shape that identifies a type of device, a manufacturer, a country of origin, or other attribute of the optical-communication device.

Battery pack 600 can include optical receiver 210. Optical receiver 210 can receive optical data from optical transmitter 120 in optical-communication device 100. Optical receiver 110 can include a photodiode, CMOS sensor, PIN diode, or other receiver (not shown.) Data received from optical receiver 210 can be converted to an electronic protocol by optical-to-electrical converter 212. Optical-to-electrical converter 212 can provide data to digital-signal processor 214. Digital-signal processor 214 can compensate for artifacts, such as smudges or abrasions, on window 1010 (shown in FIG. 5) of battery pack 600 and window 910 (shown in FIG. 5) of optical-communication device 100. Digital-signal processor 214 can provide data to an electronic device (not shown) via connector 670. Connector 670 can utilize a standard or proprietary interface, such as USB Type-C or other USB interface.

Battery pack 600 can receive electronic signals to be converted to an optical format by electrical-to-optical converter 222 via connector 670. This data can be transmitted by optical transmitter 220. Optical transmitter 120 can be a laser, light-emitting diode, vertical cavity surface-emitting diodes, or other appropriate device (not shown.) Optical transmitter 220 can provide data to optical receiver 110 in optical-communication device 100.

Time-varying currents can be generated in coil 130 by power control circuit 132 in optical-communication device 100. Currents in coil 130 in optical-communication device 100 can generate a magnetic flux that can induce currents in coil 230 in battery pack 600. In this example, coil 230 is shown in cross-section and can be implemented as loops of wire around optical receiver 210 and optical transmitter 220. Currents in coil 230 can be used by power control circuit 232 to charge battery 280 in battery pack 600. This power can be provided to the electronic device via connector 670.

Battery pack 600 can further include one or more attachment devices. For example, battery pack 600 can include one or more magnets or magnetic elements 240 that can be attracted to one or more magnets or magnetic elements 140 and optical-communication device 100. In this example, magnets or magnetic elements 240 can include one or more magnets or magnetic elements shown here in cross-section and forming a ring around coil 230 in battery pack 600.

In these and other embodiments of the present invention, optical receiver 210 and optical transmitter 220 may operate correctly independent of a rotational angle of optical-communication device 100 relative to battery pack 600. This can be particularly true when a single window 1010 is shared between optical receiver 210 and optical transmitter 220. However, having this capability can limit communication throughput to half-duplex unless optical receiver 210 and optical transmitter 220 operate using different wavelengths. To simplify full-duplex communication, it can be desirable to align optical receiver 110 and optical transmitter 120 in optical-communication device 100 with optical transmitter 220 and optical receiver 210 in battery pack 600, respectively. Accordingly, battery pack 600 can include one or more alignment magnets or magnetic elements 250. Alignment magnets or magnetic elements 250 can be attracted to one or more corresponding alignment magnets or magnetic elements 250 in optical-communication device 100. Magnets or magnetic elements 250 and magnets or magnetic elements 150 can be positioned at a single location such that their attraction helps to orient optical-communication device 100 at a specific rotational angle relative to battery pack 600.

These and other embodiments of the present invention can provide a wearable headset system that includes a wearable headset and one or more remote optical transceivers, light sources, and cameras. The remote transceivers, light sources, and cameras can be attached to a ceiling, wall, or other surface. The remote transceivers, light sources, and cameras can be attached to an optional attachment device to form an attachment structure that can be attached to the ceiling, wall, or other appropriate surface. The wearable headset can include one, two, or more optical transceivers that can communicate with the remote optical transceivers. The headset can further include one or more cameras that can be monochrome cameras, visible light cameras, or other types of cameras. A processor can receive inputs from the one or more cameras and the one or more remote cameras and can generate images for display on a screen of the wearable headset. The processor can be located in or on the wearable headset, the attachment structure, or elsewhere. The processor can be a distributed processor that is located at one or more of these positions. The distributed processor can communicate via the optical transceivers or by other method, such as by using Bluetooth. An example of such a wearable headset system is shown in the following figure.

Figure 4:
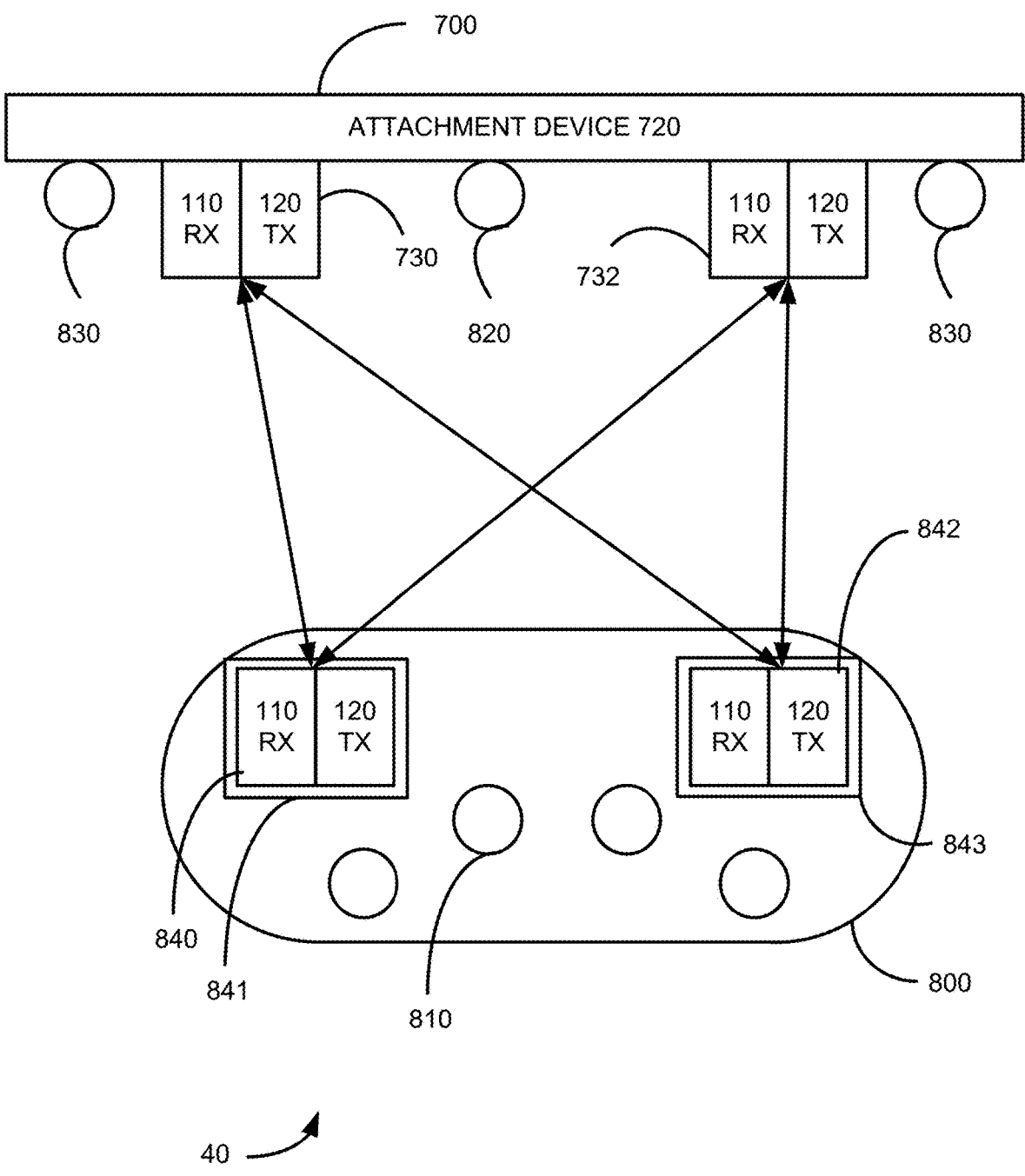
FIG. 4 illustrates a wearable headset system according to an embodiment of the present invention.

FIG. 4 illustrates a wearable headset system according to an embodiment of the present invention. Wearable headset system 40 can include wearable headset 800, first remote optical transceiver 730, second remote optical transceiver 732, one or more remote cameras 820, and one or more light sources 830. First remote optical transceiver 730, second remote optical transceiver 732, one or more remote cameras 820, and one or more light sources 830 can be attached a ceiling, wall, or other surface (not shown.) First remote optical transceiver 730, second remote optical transceiver 732, one or more remote cameras 820, and one or more light sources 830 can be attached to optional attachment device 720, such as a rack, to form attachment structure 700. Attachment structure 700 can be attached to the ceiling, wall, or other structure. One or more other components can be attached to attachment device 720. One or more remote cameras 820 can communicate with wearable headset 800 using one or more of remote optical transceiver 730 and remote optical transceiver 732 via optical transceiver 840 or optical transceiver 842, or both. Attachment structure 700 can be similar to track lighting or other lighting structure.

Wearable headset 800 can include optical transceiver 840 and optical transceiver 842 that can communicate with remote optical transceiver 730 and remote optical transceiver 732. Wearable headset 800 can further include one or more cameras 810 that can (like remote cameras 820) be monochrome cameras, visible light cameras, or other types of cameras. A processor (not shown) can receive data from the one or more cameras 810, as well as the one or more remote cameras 820 and one or more light sources 830 via the one or more remote optical transceivers 730 and 732 and can generate images for display on a screen (not shown) of wearable headset 800. The processor can be located in or on wearable headset 800, the attachment device 720, or elsewhere. The processor can be a distributed processor that is located at more than one of these positions. The distributed processor can communicate via optical transceivers 730, 732, 840, and 842, or by other method, such as by using Bluetooth or other wireless communication protocol.

The one or more light sources 830 can be any light source. The one or more light sources 830 can provide light in the visible spectrum, outside of the visible spectrum, or both. The one or more light sources can provide illumination, data, or both. The one or more light sources can communicate with wearable headset 800 via remote optical transceiver 730 and remote optical transceiver 732, or by other method, such as by using Bluetooth or other wireless communication protocol.

Optical transceiver 840 can receive and transmit optical data through window 841 in wearable headset 800. Optical transceiver 842 can receive and transmit optical data through window 843 in wearable headset 800. Window 841 and window 843 can each be formed of a single window, or separate windows can be used for the transmit and receive paths. The window or windows 841 and 843 can be formed of an infrared transmissible material. Windows 841 and 843 can have various shapes. For example, either or both window 841 and window 843 can have a shape that identifies a type of device, a manufacturer, a country of origin, or other attribute of the optical-communication device. Window 841 and window 843 can have the same or different shapes. Window 841 and window 843 can be the same as or similar to window 910 and window 1010 in the following figure.

Figure 5:
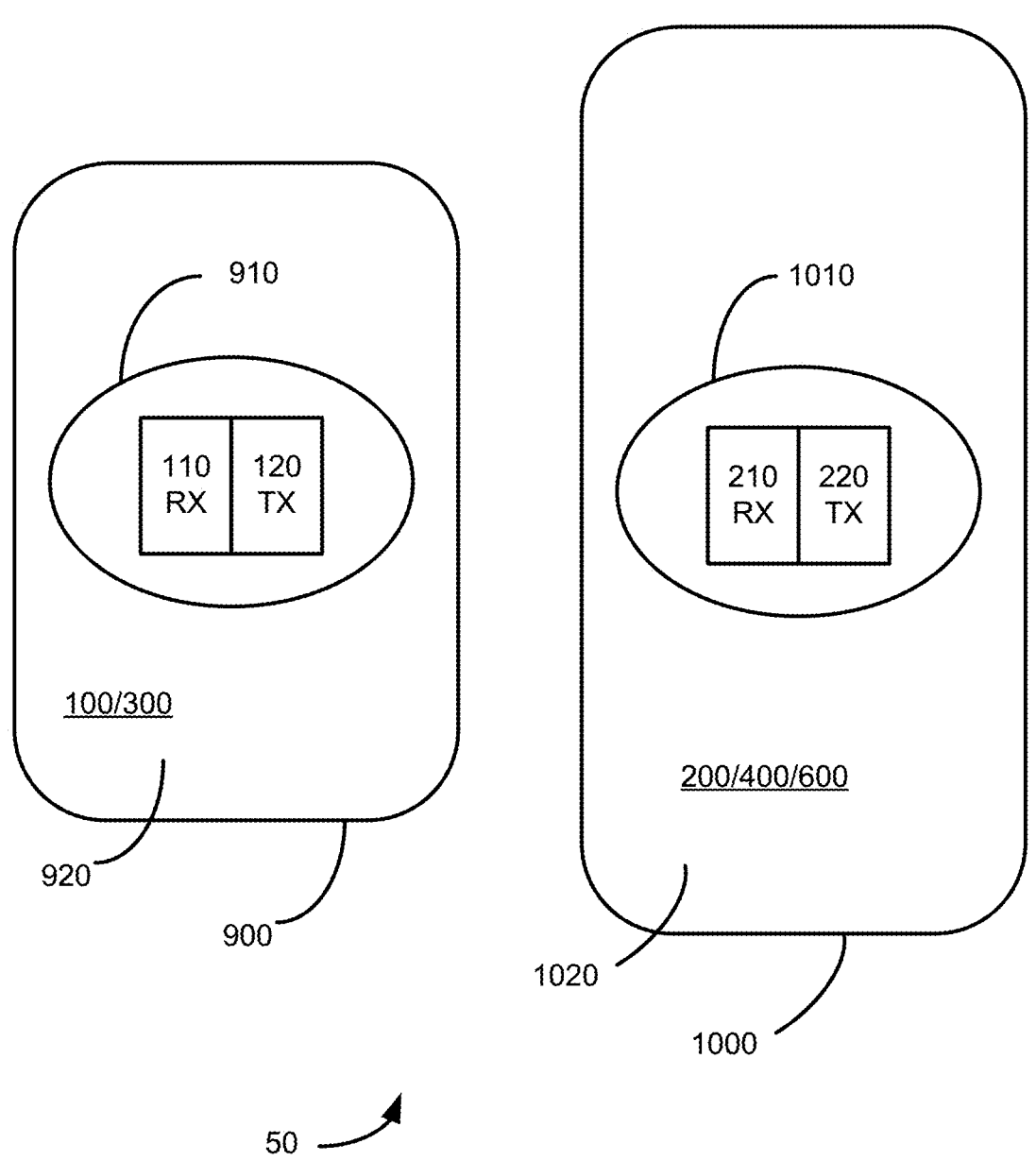
FIG. 5 illustrates contacting surfaces and optical windows for components according to an embodiment of the present invention.

FIG. 5 illustrates contacting surfaces and optical windows for components according to an embodiment of the present invention. Optical data system 50 can include one of optical-communication devices 100 or 300 that can communicate with one of electronic devices 200 or 400 or battery pack 600. Each optical-communication device 100 or 300 can include optical receiver 110 or optical transmitter 120. Each electronic device 200 or 400 or battery pack 600 can include optical receiver 210 and optical transmitter 220 (or camera receiver 410 and camera transmitter 420.) Each optical-communication device 100 or 300 can include a contact surface 920 having a window 910. Each electronic device 200 or 400 or battery pack 600 can include contacting surface 1020 having window 1010. Windows 910 and 1010 can include optically transparent areas or lenses. For example, they can be formed of infrared transmissible materials. An optical gasket (not shown) can be formed or placed around sides of the windows to prevent moisture leakage. The windows can be opaque in areas (not shown) to reduce light scattering in the optical data paths. The data paths for optical transmitters 120 and 220 and optical receivers 110 and 210 can share a single window, or separate windows can be used. In some embodiments of the present invention, optical transmit and receive signals can be alternately provided in a half-duplex or unidirectional mode. In other embodiments of the present invention, optical transmit and receive signals can be conveyed using different frequencies of light and data can be transferred in a full-duplex mode. In these and other embodiments, the optical transmit and receive signals can be proximate, noninterfering signals.

Window 910, window 1010, window 841, and window 843 can be formed of sapphire, polycarbonate, glass, or other material. These materials can exhibit excellent corrosion resistance in the presence of moisture and other liquids. This can provide electronic devices that are particularly well-suited to applications that require water resistance, such as where sweat accumulation or immersion in water can occur. These electronic devices can be well-suited for use as implantable devices, submergible devices, wearable devices, and other types of devices.

In various embodiments of the present invention, various types of data can be transferred between optical-communication device 100 or optical-communication device 300 and electronic device 200, electronic device 400, or battery pack 600. For example, optical-communication device 100 or 300 can provide firmware or software updates to electronic device 200, electronic device 400, or battery pack 600.

These and other embodiments of the present invention can include other components. For example, any of the optical-communication devices 100 or 300, electronic devices 200 or 400, or battery pack 600, can include near-field communication circuits and components. These circuits and components can detect the presence of a compatible device and can initiate optical communications or perform other functions.

In these and other embodiments of the present invention, electronic device 200 and electronic device 400 can be a portable computing device, tablet computer, desktop computer, laptop, all-in-one computer, wearable computing device, smart phone, cell phone, storage device, portable media player, navigation system, monitor, power supply, adapter, remote control device, charger, or other device.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An optical-communication device comprising:
a housing having a contacting surface, the contacting surface comprising a window;
a coil in the housing near the contacting surface to inductively provide power to an electronic device;
an optical transmitter in the housing to provide optical data to be received by the electronic device;
an optical receiver in the housing to receive optical data through the window of the optical-communication device from the electronic device;
a digital-signal processor coupled to the optical receiver to process the optical data received by the optical receiver from the electronic device, the digital-signal processor to at least partially compensate for artifacts in the received optical data caused by marring of the window of the optical-communication device and a corresponding window of the electronic device; and
a first magnet to be attracted to a first corresponding magnet in the electronic device to attach the optical-communication device to the electronic device.

2. The optical-communication device of claim 1 wherein the corresponding window of the electronic device comprises a lens.

3. The optical-communication device of claim 1 further comprising a second magnet to be attracted to a second corresponding magnet in the electronic device to align the optical-communication device to the electronic device.

4. The optical-communication device of claim 3 wherein the window of the optical-communication device is formed of an infrared transmissive material.

5. The optical-communication device of claim 4 further comprising a connector receptacle for forming pathways for power and data.

6. The optical-communication device of claim 5 further comprising control electronics coupled between the connector receptacle and the coil to receive power from the connector receptacle and to provide an alternating current to the coil.

7. The optical-communication device of claim 6 further comprising optical-to-electrical circuits to convert a transmit electrical signal to a transmit optical signal to be transmitted and to convert a received optical signal to a received electrical signal.

8. The optical-communication device of claim 7 further comprising a battery in the housing, the battery coupled to the coil and the optical-to-electrical circuits.

9. The optical-communication device of claim 3 wherein the window is shaped as an identifying mark.

10. An optical data system comprising:
an optical-communication device comprising:
a housing having a window;
a connector;
an electrical-to-optical circuit to convert electrical data received at the connector to first optical data;
a first magnet; and
an optical transmitter to transmit the first optical data through the window; and
an electronic device comprising:
a housing having a window;
a display on a surface of the electronic device;
a first camera for use in photography and to receive the first optical data through the window from the optical-communication device when the electronic device is mated to the optical-communication device;
a digital-signal processor coupled to the first camera to process the first optical data received by the first camera from the optical-communication device, the digital-signal processor to at least partially compensate for artifacts in the received first optical data caused by marring of the window of the electronic device and the window of the optical-communication device; and
a second magnet, wherein the first magnet and the second magnet secure the optical-communication device to the electronic device.

11. The optical data system of claim 10 wherein the window of the electronic device comprises a lens.

12. The optical data system of claim 10 wherein the electronic device further comprises a second camera for use in photography and to transmit second optical data and the optical-communication device further comprises an optical receiver to receive the transmitted second optical data.

13. An electronic device comprising:
a housing;
a display on a surface of the electronic device;
a first camera for use in photography and to receive first optical data from an optical-communication device when the electronic device is mated to the optical-communication device;

a digital-signal processor coupled to the first camera to process the first optical data received by the first camera from the optical-communication device, the digital-signal processor to at least partially compensate for artifacts in the received first optical data caused by marring of a window of the electronic device and a corresponding window of the optical-communication device; and a first magnet, the first magnet to secure the electronic device to a second magnet in the optical-communication device, wherein the electronic device further comprises a second camera for use in photography and to transmit second optical data to the optical-communication device.

14. The electronic device of claim 13 wherein the window of the electronic device comprises a lens of the first camera.

* * * * *